A. R. COOPER.
CONTROLLING DEVICE.
APPLICATION FILED MAR. 14, 1921.
1,432,537.
Patented Oct. 17, 1922.
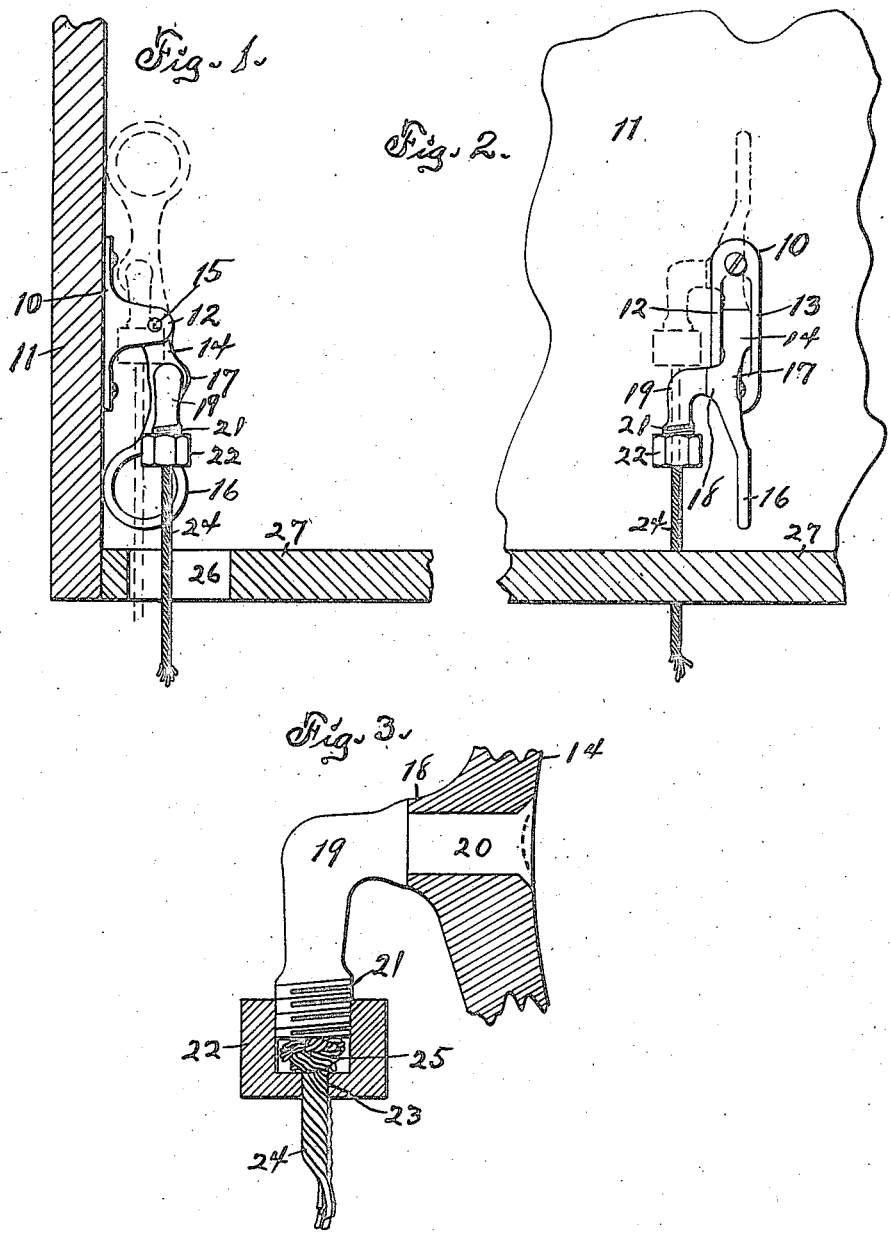

Patented Oct. 17, 1922.

1,432,537

UNITED STATES PATENT OFFICE.

ALLYN R. COOPER, OF MARSHALLTOWN, IOWA.

CONTROLLING DEVICE.

Application filed March 14, 1921. Serial No. 452,084.

*To all whom it may concern:*

Be it known that I, ALLYN R. COOPER, a citizen of the United States of America, and resident of Marshalltown, Marshall County, Iowa, have invented a new and useful Controlling Device, of which the following is a specification.

The object of this invention is to provide an improved construction for a controlling device adapted for manual operation.

A further object of this invention is to provide improved means for connecting a cable, preferably of wire, to a manually-operated lever device.

A further object of this invention is to provide means for detachably connecting the knotted end of a cable, preferably of wire, to a manually-operated lever device.

A further object of this invention is to provide a lever device with a pivoted elbow member having means for detachably securing the knotted end of a cable thereto.

My invention consists in the construction, arrangement and combination of elements hereinafter set forth, pointed out in the claims and illustrated by the accompanying drawing, in which—

Figure 1 is a side elevation, partly in section, illustrating my improved devices mounted as required for practical use. Figure 2 is a front elevation of the same. Figure 3 is a fragmentary detail elevation, partly in section, illustrating the construction of connecting elements.

In the construction of the devices as shown the numeral 10 designates a clip adapted to be mounted on and secured to a support 11, such as an upright of an automobile seat, which clip is formed with parallel spaced ears 12, 13, the spaces between said ears preferably being vertical when the clip is mounted as shown for use. A lever 14 is fulcrumed at one end on a pin 15 connecting the ears 12, 13 and said lever normally depends from said pin in a plane between said ears. The lever 14 preferably is formed with an eye 16 at its free end adapted to receive a finger of the operator for manipulation thereof. The lever 14 also, preferably is bent between its ends so that its central portion will lie, mostly if not completely, at one side of a line intersecting the axis of the lever and the center of the eye 16 when the lever is in normal depending position as shown. The central portion of the lever 14 is enlarged on the line of its lateral deflection to form a boss 17 and said boss also is made thicker than the remainder of the lever to form a hub 18, which is formed with a journal bearing countersunk at one end (Fig. 3). The outer end of the hub 18 lies in a plane laterally removed from and outside of the outermost face of the ear 12. An elbow member 19 is formed with a journal 20 at one end, which journal is pivoted in the bearing of the boss 17 and hub 18 and has its extremity expanded in the countersunk end of said bearing. The opposite end portion of the elbow-member 19 is externally threaded, 21, and a cap-nut 22 is screwed thereon. The cap-nut 22 is formed with a relatively small hole 23 in its (otherwise closed) end portion and a cable 24, preferably made of twisted or braided wire, is extended through said hole and formed with a knot 25 within said cap-nut. The cable 24 is attached to the cap-nut preliminary to screwing said nut on the elbow member 19. When the cap-nut is screwed on the elbow member it clamps the knot more or less tightly to the end of said member, thus providing a convenient and economical connection for the cable, which may be detached and adjusted as desired. The cable is adapted to extend through a hole 26 in a floor 27, if desired, to a connection with a device to be operated thereby, such as the valve of a muffler cutout not shown. When it is desired to apply draft to and through the cable 24, to operate a device secured thereto, the lever 14 is moved through an arc of substantially a half circle into the position shown by dotted lines in Figures 1 and 2, thus carrying the axis of the elbow member into a plane above and to the rear of the axis of the lever and past the dead center, so that the draft of the device maintains the position given manually.

I claim as my invention—

1. A controlling device comprising a clip, a lever fulcrumed at one end on said clip and adapted to be moved through an arc beyond a dead center, an elbow member pivoted to the lever, and means for securing a draft device to said elbow member.

2. A controlling device comprising a clip, a bent lever fulcrumed at one end on said clip and formed with a journal bearing at one side of a line intersecting the ends of the lever, an elbow member journaled in said bearing and means for securing a draft device to the free end of the elbow member.

3. A controlling device, comprising a support, an operating device on said support, a hanger on said device, one end of the hanger being exteriorly threaded, a cap-nut adapted to be screwed on said threaded end of the hanger and formed with a hole in its head, and a cable extended through said hole and formed into a knot within the cap-nut.

4. In a controlling device, a support, an operating device on said support and formed with a bearing countersunk at one end, a hanger formed with a pintle journaled in said bearing and expanded in said countersink, and connecting devices carried by said hanger.

5. In a controlling device, a lever formed with a pivot hole at one end, an eye at the opposite end and a journal bearing between its ends and lying at one side of a line intersecting the pivot hole and center of the eye, and an elbow-member journaled in said bearing and adapted to depend at one side of said lever.

Signed at Marshalltown, in the county of Marshall and State of Iowa, this 12th day of November, 1920.

ALLYN R. COOPER.